United States Patent
Kim et al.

(10) Patent No.: US 10,879,536 B2
(45) Date of Patent: Dec. 29, 2020

(54) CATHODE AND LITHIUM BATTERY INCLUDING CATHODE

(71) Applicants: Samsung Electronics Co., Ltd., Suwon-si (KR); Samsung SDI Co., Ltd., Yongin-si (KR)

(72) Inventors: Youngsoo Kim, Suwon-si (KR); Byongyong Yu, Yongin-si (KR); San Moon, Seoul (KR); Younggyoon Ryu, Suwon-si (KR); Jinhwan Park, Seoul (KR); Jaegu Yoon, Suwon-si (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 238 days.

(21) Appl. No.: 16/166,778

(22) Filed: Oct. 22, 2018

(65) Prior Publication Data

US 2019/0260031 A1   Aug. 22, 2019

(30) Foreign Application Priority Data

Feb. 22, 2018 (KR) .................. 10-2018-0021201

(51) Int. Cl.
*H01M 4/62* (2006.01)
*H01M 10/0525* (2010.01)
(Continued)

(52) U.S. Cl.
CPC .......... *H01M 4/623* (2013.01); *H01M 4/131* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| 6,379,846 B1 | 4/2002 | Terahara et al. |
| 8,753,777 B2 | 6/2014 | Choi et al. |
| (Continued) | | |

FOREIGN PATENT DOCUMENTS

| JP | 2001319685 A | 11/2001 |
| JP | 2002246029 A | 8/2002 |
| (Continued) | | |

OTHER PUBLICATIONS

Kim et al., "Electronegativity-induced enhancement of thermal stability by succinonitrile as an additive form Li ion batteries", Energy & Environmental Science, Apr. 2011, 4038.

*Primary Examiner* — Wyatt P McConnell
(74) *Attorney, Agent, or Firm* — Cantor Colburn LLP

(57) ABSTRACT

A includes a cathode active material including a lithium transition metal oxide, wherein the lithium transition metal oxide includes nickel and a non-nickel transition metal, and an amount of the nickel in the lithium transition metal oxide is about 50 mole percent or greater with respect to a total number of moles of transition metals in the lithium transition metal oxide, a conducting agent including a linear carbonaceous conducting agent, and a binder, wherein the binder includes a first fluorinated binder not including a polar functional group, a second fluorinated binder including a polar functional group, a first non-fluorinated binder including a cyano group, and a second non-fluorinated binder including a cyanoalkyl group.

23 Claims, 7 Drawing Sheets

(51) Int. Cl.
    *H01M 4/505*     (2010.01)
    *H01M 4/525*     (2010.01)
    *H01M 4/131*     (2010.01)
    *H01M 4/02*     (2006.01)

(52) U.S. Cl.
    CPC .. *H01M 10/0525* (2013.01); *H01M 2004/028* (2013.01)

(56) References Cited

U.S. PATENT DOCUMENTS

| | | |
|---|---|---|
| 9,042,341 B2 | 5/2015 | Jung et al. |
| 9,065,138 B2 | 6/2015 | Jeong et al. |
| 9,608,272 B2 | 3/2017 | Loveridge et al. |
| 9,627,690 B2 | 4/2017 | Kim et al. |
| 9,653,755 B2 | 5/2017 | Cheng et al. |
| 10,109,863 B2 | 10/2018 | Yeou et al. |
| 2017/0117533 A1 | 4/2017 | Takaichi et al. |

FOREIGN PATENT DOCUMENTS

| | | |
|---|---|---|
| JP | 2016091785 A | 5/2016 |
| JP | 201784769 A | 5/2017 |
| KR | 100708210 B1 | 4/2007 |
| KR | 1020100081904 A | 7/2010 |
| KR | 101147602 B1 | 5/2012 |
| KR | 1020130116805 A | 10/2013 |
| KR | 1020160012482 A | 2/2016 |
| KR | 1020160017364 A | 2/2016 |
| KR | 101735855 B1 | 5/2017 |
| KR | 101739299 B1 | 5/2017 |
| KR | 1020170098146 A | 8/2017 |

CATHODE AND LITHIUM BATTERY INCLUDING CATHODE

CROSS-REFERENCE TO RELATED APPLICATION

This application claims priority to and the benefit of Korean Patent Application No. 10-2018-0021201, filed on Feb. 22, 2018, in the Korean Intellectual Property Office, and all the benefits accruing therefrom under 35 U.S.C. § 119, the content of which is incorporated herein by reference in its entirety.

BACKGROUND

1. Field

The present disclosure relates to a cathode and a lithium battery including the cathode.

2. Description of the Related Art

A lithium battery is used as a power source for various electronic devices, as well as for electric vehicles, and the like. In order to provide high-performance electronic devices and electric vehicles, a lithium battery having high energy density and high capacity is desired.

To implement a high-capacity lithium battery, a cathode active material having a high capacity may be used and/or the loading level of a cathode mixture may be increased.

A cathode active material having a relatively high nickel content may provide an increased discharge capacity, but may also deteriorate lifetime characteristics and thermal stability of a lithium battery due to side reactions that occur between the cathode active material and a liquid electrolyte.

When a loading level of the cathode mixture is increased, the discharge capacity of the lithium battery may be increased, however, the thickness of the cathode may also be increased. Such a cathode having an increased thickness may have reduced flexibility, and may crack during manufacturing of the lithium battery or during charging and discharging of the lithium battery.

Therefore, it would be desirable to provide an improved nickel-rich cathode having increased loading.

SUMMARY

Provided is a cathode having improved physical properties by including a plurality of binders and a linear carbonaceous conducting agent.

Provided is a lithium battery having improved lifespan characteristics by including the cathode.

Provided is a lithium battery having an improved energy density by inclusion of a cathode including a high-capacity cathode active material and at an increased loading level.

Additional aspects will be set forth in part in the description which follows and, in part, will be apparent from the description, or may be learned by practice of the presented embodiment.

According to an aspect of an embodiment, a cathode includes a cathode active material including a lithium transition metal oxide, wherein the lithium transition metal oxide includes nickel and a non-nickel transition metal, wherein a content of the nickel in the lithium transition metal oxide is about 50 mole percent or greater with respect to a total number of moles of transition metals in the lithium transition metal oxide; a conducting agent including a linear carbonaceous conducting agent; and a binder including a first fluorinated binder not including a polar functional group, a second fluorinated binder including a polar functional group, a first non-fluorinated binder including a cyano group, and a second non-fluorinated binder including a cyanoalkyl group.

According to an aspect of another embodiment, a lithium battery includes: the cathode; an anode; and an electrolyte between the cathode and the anode.

Also disclosed is a method of manufacturing a cathode, the method including: combining a cathode active material including a lithium transition metal oxide including nickel and a non-nickel transition metal, wherein a content of the nickel in the lithium transition metal oxide is about 50 mole percent or greater with respect to a total number of moles of transition metals in the lithium transition metal oxide, a conducting agent comprising a linear carbonaceous conducting agent, and a binder including a first fluorinated binder not including a polar functional group, a second fluorinated binder including a polar functional group, a first non-fluorinated binder including a cyano group, and a second non-fluorinated binder including a cyanoalkyl group, to form a cathode composition; and forming a cathode from the cathode.

BRIEF DESCRIPTION OF THE DRAWINGS

These and/or other aspects will become apparent and more readily appreciated from the following description of the disclosed embodiment, taken in conjunction with the accompanying drawings in which.

DETAILED DESCRIPTION

Figure 1:
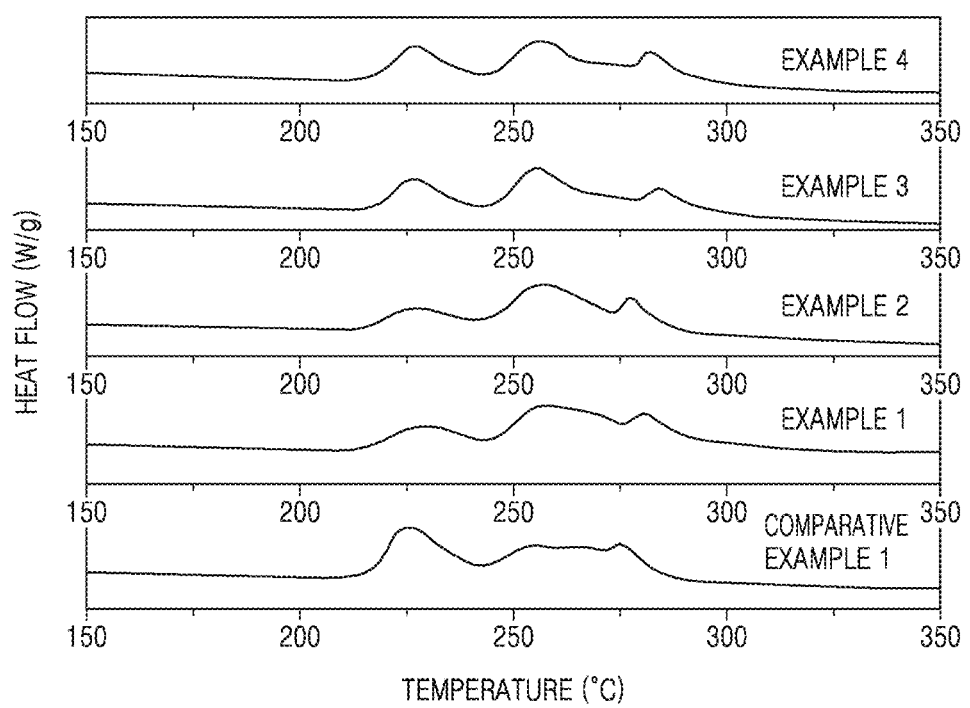
FIG. 1 is a graph of heat flow (watts per gram, W/g) versus temperature, and is a thermogram showing the results of differential scanning calorimetry (DSC) for the cathodes manufactured in accordance with Examples 1 to 4 and Comparative Example 1.

The present inventive concept will now be described more fully with reference to the accompanying drawings, in which an example embodiment is shown. The present inventive concept may, however, be embodied in many different forms, should not be construed as being limited to the embodiment set forth herein, and should be construed as including all modifications, equivalents, and alternatives within the scope of the present inventive concept; rather, this embodiment is provided so that this inventive concept will be thorough and complete, and will fully convey the effects and features of the present inventive concept and ways to implement the present inventive concept to those skilled in the art.

The terminology used herein is for the purpose of describing a particular embodiment only and is not intended to be limiting of the inventive concept. As used herein, the singular forms "a", "an," and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A C rate is a measure of the rate a battery is charged or discharged relative to its maximum capacity. A 1C rate means a current which will discharge the entire capacity in one hour. Thus, for example, for a battery with a capacity of 100 ampere-hrs, a C rate discharge would be a discharge current of 100 amperes.

Hereinafter, a cathode according to an embodiment, and a lithium battery including the cathode, according to an embodiment, will be described in greater detail.

In accordance with an aspect of the disclosure, a cathode includes a cathode active material, a conducting agent, and a binder.

The cathode active material includes a lithium transition metal oxide including nickel and a non-nickel transition metal, and an amount of the nickel is about 50 mole percent (mol %) or greater with respect to a total number of moles of transition metals in the lithium transition metal oxide;

The conducting agent includes a linear carbonaceous conducting agent.

The binder composition includes a first fluorinated binder (i.e., fluorine-based binder) not containing a polar functional group, a second fluorinated binder (i.e, a fluorine-based binder) containing a polar functional group, a first non-fluorinated binder (i.e., a fluorine-based binder) containing a cyano group, and a second non-fluorinated binder (i.e., a fluorine-based binder) containing a cyanoalkyl group. In an embodiment, the second non-fluorine-based binder may further contain a hydroxyl group, i.e., the second binder may be a cyanoalkyl-substituted, hydroxyl group-containing binder.

The second non-fluorine-based binder containing a cyanoalkyl group may effectively suppress heat generation resulting from a side reaction between a nickel-rich lithium transition metal oxide and a liquid electrolyte. Without being limited by theory, it is believed that heat suppression by the second non-fluorine-based binder is due to its structure, in which a cyano functional group is linked to a side chain of the polymer main backbone (via the alkyl group), and is not directly linked to the polymer main backbone as in the first non-fluorine-based binder. That is, the second non-fluorine-based binder may reduce a heat generation rate in the cathode and inhibit deterioration of the nickel-rich lithium transition metal oxide. Accordingly, the cathode including the second non-fluorine-based binder may have improved thermal stability. Consequently, a lithium battery including such a cathode may have improved thermal stability and cycle characteristics. The lithium battery may have improved high-temperature cycle characteristics.

An amount of the second non-fluorine-based binder in the cathode may be, for example, about 2 weight percent (wt %) or less, or about 1.5 wt % or less, or about 1 wt % or less. For example, an amount of the second non-fluorine-based binder may be about 0.1 wt % to about 2 wt %, about 0.1 wt % to about 1.5 wt %, about 0.1 wt % to about 1.0 wt %, about 0.1 wt % to about 0.7 wt %, about 0.1 wt % to about 0.5 wt %, or about 0.1 wt % to about 0.3 wt %, based on a total weight of the cathode active material, the conducting agent, and the binder. The thermal stability of the cathode may be further improved by the inclusion of the second non-fluorine-based binder within these amount ranges. Accordingly, a lithium battery including such a cathode may have further improved cycle characteristics.

The second non-fluorine-based binder may be, for example, a cyanoalkyl polymer. As used herein, the term "cyanoalkyl polymer" refers to a polymer containing a cyanoalkyl group, preferably a plurality of cyanoalkyl groups. The cyanoalkyl polymer may be one in which a cyanoalkyl group is reacted with and covalently bound to an oxygen derived from a hydroxyl group in a hydroxyl group-containing polymer. The cyanoalkyl polymer may be, for example, a random copolymer obtained by partially derivatizing a hydroxyl group of a hydroxyl group-containing polymer, in which —OH and —O—RCN (wherein —RCN denotes the cyanoalkyl group) are randomly or irregularly bonded to the polymer. Alternatively, the cyanoalkyl polymer may be one in which a cyanoalkyl group-containing monomer is polymerized, or a hydroxyl group-containing monomer and a cyanoalkyl group-containing monomer are copolymerized. Thus, the second non-fluorine-based binder may be a polymer comprising a cyanoalkyl-substituted unit. Such copolymers may be random or block copolymers.

The second non-fluorine-based binder may include, for example, a cyanoalkyl polyvinyl alcohol, a cyanoalkyl pullulan, a cyanoalkyl cellulose, a cyanoalkyl hydroxymethyl cellulose, a cyanoalkyl hydroxyethyl cellulose, a cyanoalkyl hydroxypropyl cellulose, a cyanoalkyl starch, a cyanoalkyl dextrin, a cyanoalkyl collagen, a cyanoalkyl carboxymethyl cellulose, or a combination thereof. However, an embodiment is not limited thereto. Any suitable compound that may be used as a cyanoalkyl polymer may be used. An alkyl group (R) of the cyanoalkyl group may include 1 to 10 carbon atoms, or 1 to 6 carbon atoms.

The second non-fluorine-based binder may include, for example, a cyanoethyl polyvinyl alcohol, a cyanoethyl pullulan, a cyanoethyl cellulose, a cyanoethyl hydroxymethyl cellulose, a cyanoethyl hydroxyethyl cellulose, a cyanoethyl hydroxypropyl cellulose, a cyanoethyl starch, a cyanoethyl dextrin, a cyanoethyl collagen, a cyanoethyl carboxymethyl cellulose, or a combination thereof.

The second non-fluorine-based binder may be, for example, a cyanoethyl polyvinyl alcohol represented by Formula 1:

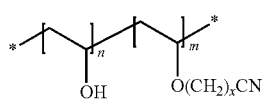

Formula 1

In Formula 1, n and m each denote a molar fraction of a repeating unit, 0≤n<1, 0<m<1, n+m=1, and x=1-20, or x=1-10. Preferably, x=2.

The first non-fluorine-based binder containing a cyano group and the second non-fluorine-based binder containing a cyanoalkyl group may improve dispersion of the linear carbonaceous conducting agent in a cathode and may also improve the flexibility of the cathode. Accordingly, the cathode including the first non-fluorine-based binder and the second non-fluorine-based binder may have reduced internal resistance, and may be less vulnerable to cracking during manufacturing of a battery. Consequently, a lithium battery including such a cathode may also have reduced internal resistance, and cracking of the lithium battery during the process of winding during manufacture or charging and discharging may be inhibited, thus leading to improved cycle characteristics of the lithium battery.

An amount of the first non-fluorine-based binder in the cathode may be, for example, about 2 wt % or less, or about 1.5 wt % or less, or about 1 wt % or less, or about 0.1 wt % to about 2 wt %, about 0.1 wt % to about 1.5 wt %, about 0.1 wt % to about 1.0 wt %, about 0.1 wt % to about 0.7 wt %, about 0.1 wt % to about 0.5 wt %, or about 0.1 wt % to about 0.3 wt %, based on a total weight of the cathode active material, the conducting agent, and the binder. By including the first non-fluorine-based binder within these amount ranges, the cathode may have further improved flexibility and electrical conductivity. A lithium battery including such a cathode may have further improved cycle characteristics.

The first non-fluorine-based binder contains a cyano group. In an embodiment the cyano group may be directly bonded to the backbone of the binder. For example, the first non-fluorine-based binder may include a repeating unit derived from an acrylonitrile-containing (i.e., acrylonitrile-based monomer) and a repeating unit derived from an ethylenically unsaturated monomer, i.e., an olefin-based monomer. The acrylonitrile-based monomer may be, for example, acrylonitrile, methacrylonitrile, or a combination thereof. The olefin-based monomer may be, for example, 1,3-butadiene, isoprene, 2,3-dimethyl-1,3-butadiene, 1,3-pentadiene, 1,4-pentadiene, 1,4-hexadiene, ethylene, propylene, 1-butene, or a combination thereof. The first non-fluorine-based binder may be, for example, a hydrogenated binder that substantially does not include a double bond in its main backbone. The first non-fluorine-based binder may be, for example, a hydrogenated acrylonitrile-butadiene rubber (NBR). An amount of the repeating unit derived from an acrylonitrile-based monomer in the first non-fluorine-based binder may be, for example, about 1 wt % to about 70 wt %, about 2 wt % to about 50 wt %, about 5 wt % to about 30 wt %, or about 10 wt % to about 25 wt %, based on a total weight of the first non-fluorine-based binder.

An amount of the repeating unit derived from an olefin-based monomer in the first non-fluorine-based binder may be, for example, about 30 wt % to about 99 wt %, 50 wt % to about 98 wt %, 70 wt % to about 95 wt %, or about 75 wt % to about 90 wt %, based on a total weight of the first non-fluorine-based binder. When the first non-fluorine-based binder includes an acrylonitrile-based monomer and/or an olefin-based monomer within these ranges, the dispersibility of the linear carbonaceous conducting agent may be improved.

The first non-fluorine-based binder may have a weight average molecular weight of about 100,000 Daltons or greater, for example, about 100,000 Daltons to about 1,000,000 Daltons, about 100,000 Daltons to about 800,000 Daltons, about 100,000 Daltons to about 600,000 Daltons, about 100,000 Daltons to about 500,000 Daltons, or about 100,000 Daltons to about 300,000 Daltons. If the first non-fluorine-based binder has a weight average molecular weight within these ranges, the cathode may have further improved flexibility. The first non-fluorine-based binder may have a glass transition temperature (Tg) of, for example, about −40° C. to about 30° C., about −40° C. to about 25° C., about −40° C. to about 20° C., about −40° C. to about 15° C., or about −40° C. to about 5° C. When the first non-fluorine-based binder has a low glass transition temperature within the above-described ranges, formation of an adhesive network in the cathode may be facilitated by the first non-fluorine-based binder.

The first fluorine-based binder not including a polar functional group and the second fluorine-based binder containing a polar functional group may maintain an appropriate viscosity of a solution when dissolved in a non-aqueous solvent to improve dispersibility of the cathode active material and may provide strong binding strength within the cathode active material and between the cathode active material and an electrode plate. Accordingly, the first fluorine-based binder and the second fluorine-based binder may improve dimensional stability of the cathode. Accordingly, as a result, during charging and discharging, separation of a cathode mixture from a cathode current collector or cracking of the cathode mixture may be prevented, and thus a lithium battery including such a cathode may have improved cycle characteristics.

An amount of the first fluorine-based binder in the cathode not including a polar functional group may be, for example, about 2 wt % or less, or about 1.5 wt % or less, or about 1 wt % or less, or may be about 0.1 wt % to about 2 wt %, about 0.1 wt % to about 1.5 wt %, about 0.1 wt % to about 1.0 wt %, about 0.1 wt % to about 0.7 wt %, about 0.1 wt % to about 0.5 wt %, or about 0.1 wt % to about 0.3 wt %, based on a total weight of the cathode active material, the conducting agent, and the binder. When the cathode includes the first fluorine-based binder within the above-described ranges, dispersibility of the cathode active material in the cathode may be further improved. Accordingly, a lithium battery including such a cathode may have further improved cycle characteristics.

The first fluorine-based binder does not include a polar functional group. For example, the fluorine-based binder may be any binder which includes fluorine and does not include a functional group such as, for example, a carboxylic acid group, a sulfonic acid group, a phosphoric acid group, an amino group, a hydroxyl group, a salt thereof, or a combination thereof. For example, the first fluorine-based binder may be a vinylidene fluoride-based binder. For example, the first fluorine-based binder may be a vinylidene fluoride homopolymer, or may a copolymer of vinylidene fluoride as a monomer and another fluorine-containing monomer. The fluorine-containing monomer may include tetrafluoroethylene, hexafluoropropylene, chlorotrifluoroethylene, fluorovinyl, perfluoroalkyl vinyl ether, or a combination thereof. For example, the first fluorine-based binder may be a vinylidene fluoride homopolymer, a vinylidene fluoride-hexafluoropropylene copolymer, a vinylidene fluoride-chlorotrifluoroethylene copolymer, or a combination thereof. However, an embodiment is not limited thereto. Any fluorine-based binder which includes fluorine but does not include a polar functional group may be used. The first fluorine-based binder may be, for example, a polyvinylidene fluoride (PVDF) binder.

An amount of repeating units derived from the vinylidene fluoride in the first fluorine-based binder may be, for example, about 50 mole percent (mol %) or greater, about 60 mol % or greater, about 70 mol % or greater, about 80 mol % or greater, or about 90 mol % or greater, based on a total content of the first fluorine-based binder. The first fluorine-based binder may have a weight average molecular weight of, for example, about 1,000,000 Daltons or less, about 100,000 Daltons to about 1,000,000 Daltons, about 200,000 Daltons to about 900,000 Daltons, about 300,000 Daltons to about 800,000 Daltons, about 500,000 Daltons to about 700,000 Daltons, or about 670,000 Daltons to about 700,000 Daltons. When the first fluorine-based binder has a weight average molecular weight within the above-described ranges, a cathode including the first fluorine-based binder may have further improved dispersibility of the cathode active material.

An amount of the second fluorine-based binder containing a polar functional group in the cathode may be, for example, about 2 wt % or less, or about 1.5 wt % or less, or about 1 wt % or less, for example, about 0.1 wt % to about 2 wt %, about 0.1 wt % to about 1.5 wt %, about 0.1 wt % to about 1.0 wt %, about 0.1 wt % to about 0.7 wt %, about 0.1 wt % to about 0.5 wt %, or about 0.1 wt % to about 0.3 wt %, based on a total weight of the cathode active material, the conducting agent, and the binder. When the cathode includes the second fluorine-based binder within these amount ranges, adhesion between the cathode active material and the electrode plate may be further improved, and a lithium battery using such a cathode may have further improved cycle characteristics.

The second fluorine-based binder containing a polar functional group may include a repeating unit derived from a polar functional group-containing monomer, a repeating unit derived from vinylidene fluoride, and optionally, a repeating unit derived from at least one fluorine-containing monomer. The fluorine-containing monomer may include tetrafluoroethylene, hexafluoropropylene, chlorotrifluoroethylene, fluorovinyl, perfluoroalkyl vinyl ether, or a combination thereof. The polar functional group of the second fluorine-based binder may include a carboxylic acid group, a sulfonic acid group, a phosphoric acid group, an amino group, a hydroxyl group, a salt thereof, or a combination thereof. However, an embodiment is not limited thereto. Any polar functional group suitable as a polar functional group in a fluorine-based binder may be used.

For example, the polar functional group may be a carboxylic acid group or a sulfonic acid group. Without being limited by theory, it is understood that when the polar functional group is functional group such as a carboxylic acid group or a sulfonic acid group binding with the cathode active material and binding between a cathode active material layer and a current collector are improved. In particular, to increase efficiency in the capture of transition metal ions released from a nickel-rich lithium transition metal oxide, for example, a carboxylic acid group may be selected as the polar functional group.

The second fluorine-based binder may be, for example, a copolymer of a polar functional group-containing monomer and vinylidene fluoride, or a copolymer of a polar functional group-containing monomer, vinylidene fluoride, and another fluorine-based monomer, for example one of the above-described fluorine-based monomers. The second fluorine-based binder may be, for example, a polar functional group-containing monomer-vinylidene fluoride copolymer, a polar functional group-containing monomer-vinylidene fluoride-hexafluoropropylene copolymer, a polar functional group-containing monomer-vinylidene fluoride-chlorotrifluoroethylene copolymer, or a combination thereof. However, an embodiment is not limited thereto. Any suitable polar group-containing fluoride-based binder may be used. The second fluorine-based binder may be, for example, a carboxylic acid group (—COOH)-containing polyvinylidene fluoride (PVDF) binder. In the second fluorine-based binder, an amount of the repeating unit derived from the other fluorine-based monomer, except for the vinylidene fluoride monomer, may be, for example, about 5 mol % or less, or about 3 mol % or less, or about 1 mole % or less, based on a total content of the second fluorine-based binder. An amount of the repeating unit derived from a fluorine-containing monomer (e.g., vinylidene fluoride) in the second fluorine-based binder may be, for example, about 50 mol % or greater, about 60 mol % or greater, about 70 mol % or greater, about 80 mol % or greater, or about 90 mol % or greater, based on a total content of the second fluorine-based binder. When the second fluorine-based binder includes the fluorine-containing monomer(s) within the above-described ranges, the second fluorine-based binder may have improved chemical stability.

The amount of the repeating unit derived from a polar functional group-containing monomer in the second fluorine-based binder may be, for example, about 10 mol % or less, or about 8 mol % or less, or about 5 mol % or less, for example, about 0.1 mol % to about 9 mol % or less, about 0.1 mol % to about 8 mol % or less, about 0.1 mol % to about 7 mol % or less, or about 0.1 mol % to about 5 mol % or less, based on a total content of the second fluorine-based binder. When the second fluorine-based binder includes a repeating unit derived from a polar functional group-containing monomer within these amount ranges, the second fluorine-based binder may have further improved solvent resistance to an electrolyte solution.

The second fluorine-based binder may have a weight average molecular weight of, for example, about 1,000,000 Daltons or greater, about 1,000,000 Daltons to about 2,000,000 Daltons, about 1,000,000 Daltons to about 1,800,000 Daltons, about 1,000,000 Daltons to about 1,500,000 Daltons, or about 1,000,000 Daltons to about 1,200,000 Daltons. The weight average molecular weight of the second fluorine-based binder are determined using gel permeation chromatography (GPC) and a polystyrene standard. When the second fluorine-based binder has a weight average molecular weight within these ranges, the adhesion of the cathode active material to the current collector may be further improved.

A weight ratio of the first fluorine-based binder not including a polar functional group to the second fluorine-based binder containing a polar functional group may be, for example, about 90:10 to about 10:90, about 90:10 to about 50:50, about 90:10 to about 60:40, or about 90:10 to about 80:20. When a weight ratio of the first fluorine-based binder to the second fluorine-based binder is within these ranges, dispersibility of the cathode active material may be improved, and the adhesion between the cathode active material and current collector may be further improved.

In the cathode according to an embodiment, a weight ratio of a total amount of fluorine-based binder, including both the first fluorine-based binder and the second fluorine-based binder, to the cyanoalkyl group-containing second non-fluorine-based binder may be, for example, about 90:10 to about 10:90, about 80:20 to about 20:80, about 70:30 to about 30:70, or about 60:40 to about 40:60. When a weight ratio of the total amount of fluorine-based binder to the second non-fluorine-based binder is within these ranges, the cathode may have further improved thermal stability, and a lithium battery including such a cathode may have further improved high-temperature cycle characteristics.

A total amount of the binder composition, including the first fluorine-based binder, the second fluorine-based binder, the first non-fluorine-based binder, and the second non-fluorine-based binder may be, for example, about 0.1 wt % to about 5 wt %, about 0.1 wt % to about 3 wt %, about 0.1 wt % to about 2.5 wt %, about 1.0 wt % to about 2 wt %, about 0.1 wt % to about 1.5 wt %, or about 0.1 wt % to about 1.3 wt %, based on a total weight of the cathode (the cathode active material, the conducting agent, and the binder). When the cathode includes the binder within these amount ranges, the cathode may have further improved thermal resistance, flexibility and/or electrical conductivity.

The linear carbonaceous conducting agent may include a carbon nanotube (CNT), a carbon nanofiber, a carbon nanorod, or a combination thereof. However, an embodiment is not limited thereto. Any suitable linear carbonaceous conducting agent available in the art may be used. The linear carbonaceous conducting agent may have an aspect ratio of about 2 or greater, about 3 or greater, about 4 or greater, about 5 or greater, about 10 or greater, about 20 or greater, about 50 or greater, or about 100 or greater. The aspect ratio of the linear carbonaceous conducting agent refers to a ratio of the maximum length to the minimum length between any opposite ends thereof. For example, the aspect ratio of a carbon nanotube may refer to a ratio of the length to the diameter of the carbon nanotube. When the linear carbonaceous conducting agent has a high aspect ratio within these ranges, the linear carbonaceous conducting agent may be three-dimensionally dispersed in the cathode to form a conductive network, even when an amount of the linear carbonaceous conducting agent in the cathode is relatively low, thus improving electrical conductivity of the cathode.

The linear carbonaceous conducting agent may be, for example, a carbon nanotube (CNT). The carbon nanotube may be, for example, a single-walled carbon nanotube, a double-walled carbon nanotube, a multi-walled carbon nanotube, a carbon nanotube bundle, or a combination thereof. The carbon nanotube may have a diameter of about 5 nanometers (nm) to about 50 nm, or about 5 nm to about 30 nm, or about 10 nm to about 30 nm, and a length of about 1 micrometer (μm) to about 50 μm, or about 2 μm to about 45 μm, or about 5 μm to about 35 μm.

In an embodiment, the conducting agent may further include a particulate carbonaceous conducting agent in addition to the linear carbonaceous conducting agent. The particulate carbonaceous conducting agent may have an aspect ratio of less than 2, less than 1.8, or less than 1.5. The particulate carbonaceous conducting agent may include carbon black, acetylene black, Ketjen black, channel black, furnace black, lamp black, summer black, natural graphite, artificial graphite, or a combination thereof. However, an embodiment is not limited thereto. Any particulate carbonaceous conducting agent suitable for a lithium battery may be used. For example, the particulate carbonaceous conducting agent may be carbon black. A weight ratio of the linear carbonaceous conducting agent to the particulate carbonaceous conducting agent may be about 90:10 to about 10:90, about 90:10 to about 50:50, about 90:10 to about 60:40, or about 90:10 to about 80:20. When the weight ratio of the linear carbonaceous conducting agent to the particulate carbonaceous conducting agent is within these ranges, dispersibility of the conducting agent may be improved, and the cathode may have further increased electrical conductivity even when the total amount of the conducting agent in the cathode is relatively low.

In the cathode according to an embodiment, a total amount of the conducting agent (e.g., linear carbonaceous conducting agent and particulate carbonaceous conducting agent) may be about 0.1 wt % to about 3 wt %, about 0.1 wt % to about 2.5 wt %, about 1.0 wt % to about 2 wt %, about 0.1 wt % to about 1.5 wt %, or about 0.1 wt % to about 1.0 wt %, based on a total weight of the cathode (e.g., the cathode active material, the conducting agent, and the binder). When the cathode includes the conducting agent within these amount ranges, the cathode may have further improved electrical conductivity.

The cathode active material may include a lithium transition metal oxide including nickel and a non-nickel transition metal. An amount of the nickel in the lithium transition metal oxide may be, for example, about 50 mol % or greater, about 60 mol % or greater, about 70 mol % or greater, about 80 mol % or greater, about 82 mol % or greater, about 85 mol % or greater, about 87 mol % or greater, or about 90 mol % or greater, based on a total number of moles of the transition metals. When the cathode active material has a high nickel content within these ranges, the cathode may have further improved discharge capacity.

The lithium transition metal oxide may be, for example, a compound represented by Formula 2.

$$Li_aNi_xCo_yM_zO_{2-b}A_b \quad \text{Formula 2}$$

In Formula 2, $1.0 \leq a \leq 1.2$, $0 \leq b \leq 0.2$, $0.7 \leq x < 1$, $0 < y \leq 0.3$, $0 < z \leq 0.3$, $x+y+z=1$, M may be manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B); and A may be fluorine (F), sulfur (S), chlorine (Cl), bromine (Br), or a combination thereof. In an embodiment, $0.8 \leq x < 1$, $0 < y \leq 0.2$, $0 < z \leq 0.2$; $0.83 \leq x < 0.97$, $0 < y \leq 0.15$, and $0 < z \leq 0.15$. In another embodiment, $0.85 \leq x < 0.95$, $0 < y \leq 0.1$, and $0 < z \leq 0.1$.

The lithium transition metal oxide may be a compound represented by one of Formulae 3 and 4.

$$\text{LiNi}_x\text{Co}_y\text{Mn}_z\text{O}_2 \qquad \text{Formula 3}$$

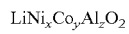

$$\text{LiNi}_x\text{Co}_y\text{Al}_z\text{O}_2 \qquad \text{<Formula 4>}$$

In Formulae 3 and 4, $0.8 \leq x \leq 0.95$, $0 < y \leq 0.2$, and $0 < z \leq 0.1$. In some embodiments, $0.82 \leq x \leq 0.95$, $0 < y \leq 0.15$, and $0 < z \leq 0.15$. In another embodiment, $0.85 \leq x \leq 0.95$, $0 < y \leq 0.1$, and $0 < z \leq 0.1$.

The lithium transition metal oxide may be, for example, $\text{LiNi}_{0.7}\text{Co}_{0.2}\text{Mn}_{0.1}\text{O}_2$, $\text{LiNi}_{0.88}\text{Co}_{0.08}\text{Mn}_{0.04}\text{O}_2$, $\text{LiNi}_{0.8}\text{Co}_{0.15}\text{Mn}_{0.05}\text{O}_2$, $\text{LiNi}_{0.8}\text{Co}_{0.1}\text{Mn}_{0.1}\text{O}_2$, $\text{LiNi}_{0.88}\text{Co}_{0.1}\text{Mn}_{0.02}\text{O}_2$, $\text{LiNi}_{0.8}\text{Co}_{0.15}\text{Al}_{0.05}\text{O}_2$, $\text{LiNi}_{0.8}\text{Co}_{0.1}\text{Mn}_{0.2}\text{O}_2$, $\text{LiNi}_{0.88}\text{Co}_{0.1}\text{Al}_{0.02}\text{O}_2$, or a combination thereof. The lithium transition metal oxide may be additionally doped with a doping element, such as, for example, aluminum (Al).

The cathode active material according to an embodiment may have a bimodal particle size distribution in a particle size distribution obtained by, for example, light scattering. When the lithium transition metal oxide has a bimodal particle size distribution, the cathode including the lithium transition metal oxide may have further improved mixture density. An amount of the cathode active material in the cathode may be, for example, about 70 wt % to about 99 wt %, about 80 wt % to about 90 wt %, about 90 wt % to about 99 wt %, about 95 wt % to about 99 wt %, or about 97 wt % to about 99 wt %, based on a total weight of the cathode active material, the conducting agent, and the binder. When the cathode includes the cathode active material within the above-described ranges, the cathode may have further improved discharge capacity.

When the cathode includes a linear carbonaceous conducting agent, a first fluorine-based binder, a second fluorine-based binder, a first non-fluorine-based binder, and a second non-fluorine-based binder as described above, the cathode has improved flexibility and thermal stability, and as a result, cracking and heat generation which are likely to occur as the thickness of the cathode increases, may be inhibited. In addition, by inclusion of the nickel-rich lithium transition metal oxide, the cathode may have an increased discharge capacity. As a result, the cathode may have improved cycle characteristics and a loading level of about 4.0 milliampere hours per square centimeter (mAh/cm²) or greater. Accordingly, it may be possible to implement a lithium battery having improved cycle characteristics and a high energy density of about 500 Watt hours per liter (Wh/L) or greater by using the cathode. For example, a loading level of the cathode may be about 4.0 mAh/cm² or greater, about 4.3 mAh/cm² or greater, about 4.5 mAh/cm² or greater, about 5.0 mAh/cm² or greater, about 5.5 mAh/cm² or greater, or about 6.0 mAh/cm² or greater. A weight per unit area of the cathode may be, for example, 40 milligrams per square centimeter (mg/cm²) or greater, about 45 mg/cm² or greater, about 50 mg/cm² or greater, or about 55 mg/cm² or greater. A press density of the cathode may be, for example, about 3.0 grams per cubic centimeter (g/cc) or greater, about 3.2 g/cc or greater, about 3.4 g/cc or greater, about 3.6 g/cc or greater, about 3.8 g/cc or greater, or about 4.0 g/cc or greater.

The cathode may have improved flexibility. For example, the cathode may not break after bending at an angle of, for example, about 90 degrees or greater, about 100 degrees or greater, about 110 degrees or greater, about 120 degrees or greater, about 130 degrees or greater, about 140 degrees or greater, or about 150 degrees greater, or even at the maximum mechanical bending angle limit of a Universal Testing Machine, as measured by the flexural properties test according to ASTM D790. The cathode may also not break after being bent at an angle of about 90 degrees or greater, about 100 degrees or greater, about 110 degrees or greater, about 120 degrees or greater, about 130 degrees or greater, about 140 degrees or greater, about 150 degrees or greater, about 160 degrees or greater, or about 170 degrees or greater, or even at an angle above the maximum mechanical bending angle limit, when subjected to manual finger pressing/bending. When the cathode has such improved flexibility, cracking may be inhibited during a winding of the cathode or during charging and discharging of a lithium battery including the cathode.

In accordance with another aspect of the disclosure, a lithium battery includes: the cathode according to an embodiment including a cathode active material, a binder, and a conducting agent as described above; an anode; and an electrolyte between the cathode and the anode.

The lithium battery including the cathode according to an embodiment, may have improved energy density and cycle characteristics. For example, by using the cathode having improved cycle characteristics and a loading level of about 4.0 mAh/cm² or greater, it may be possible to implement a lithium battery having improved cycle characteristics and a high energy density of about 500 Wh/L or greater. The lithium battery according to an embodiment may have an energy density of, for example, about 500 Wh/L or greater, about 550 Wh/L or greater, about 600 Wh/L or greater, about 650 Wh/L or greater, about 700 Wh/L or greater, or about 800 Wh/L or greater. Accordingly, the lithium battery according to an embodiment is suitable for use in, for example, electric vehicles that benefit from high energy input.

The lithium battery according to an embodiment may be any type of lithium battery, for example, a lithium ion battery, a lithium ion polymer battery, or a lithium sulfur battery. The lithium battery may be a lithium primary battery or a lithium secondary battery. Unless stated otherwise herein, the lithium battery according to an embodiment may refer to a lithium secondary battery.

The lithium battery according to an embodiment may be manufactured according to the following method. However, an embodiment is not limited thereto. Any manufacturing method available in the art may be used.

First, the cathode according to an embodiment may be manufactured as follows.

A cathode active material, a conducting agent, a binder, and a solvent may be mixed together to prepare a cathode active material composition. Subsequently, the cathode active material composition may be directly coated on a cathode current collector to manufacture the cathode. In an embodiment, the cathode active material composition may be cast on a separate support to form a cathode active material film. This cathode active material film may then be separated from the support and laminated on a metal current collector, to thereby manufacture the cathode.

The cathode active material in the cathode active material composition may include the above-described lithium transition metal oxide including nickel and a non-nickel transition metal. The lithium transition metal oxide may be a nickel-rich lithium transition metal oxide, having a nickel content of about 50 mol % or greater of a total number of moles of the transition metals. The nickel-rich lithium transition metal oxide may be a lithium transition metal oxide represented by at least one of Formulae 1 to 3. The conducting agent used in the cathode active material composition may include a linear carbonaceous conducting agent, either alone or as a combination of a linear carbonaceous conducting agent and a particulate carbonaceous conducting agent. The binder used in the cathode active material composition may include a first fluorine-based binder not including a polar functional group, a second fluorine-based binder including a polar functional group, a first non-fluorine-based binder including a cyano group, and a second non-fluorine-based binder including a cyanoalkyl group. The solvent used in the cathode active material composition may be N-methylpyrrolidone, acetone, water, or a combination thereof. However, an embodiment is not limited thereto. Any suitable solvent may be used. An amount of the solvent may be about 10 parts to about 100 parts by weight, or about 10 parts by weight to bout 90 parts by weight, or about 20 parts by weight to about 75 parts by weight, with respect to 100 parts by weight of the cathode active material.

The cathode active material composition may be prepared to include, for example, a cathode active material including a nickel-rich lithium transition metal oxide of any of Formulae 1 to 3, a conducting agent including a mixture of carbon nanotubes and carbon black, a binder composition including a mixture of polyvinylidene fluoride (PVDF), a carboxylic acid group (—COOH)-containing polyvinylidene fluoride (PVDF), a hydrogenated acrylonitrile-butadiene rubber (NBR), and cyanoethyl-polyvinyl alcohol (PVA-CN), and a solvent including N-methylpyrrolidone (NMP). The cathode may be manufactured, for example, by combining solid components including about 97.7 wt % of the cathode active material, about 1 wt % of the conducting agent, and about 1.3 wt % of the binder 1.3 wt %, and adding the solvent in an amount of up to about 70 wt %, or about 65 wt %, or about 50 wt % of the solid components ingredients to prepare a cathode active material slurry, and then coating, drying, and roll-pressing the cathode active material slurry on a cathode current collector.

The cathode current collector may have a thickness of, for example, about 3 μm to about 50 μm, or about 3 μm to about 40 μm, or about 5 μm to bout 30 μm. The cathode current collector may be any material having a high electrical conductivity and which does not cause a chemical change in the lithium battery. For example, the cathode current collator may be stainless steel, aluminum, nickel, titanium, sintered carbon, aluminum or stainless steel that is surface-treated with carbon, nickel, titanium, or silver, or a combination thereof. For example, the cathode current collector may be processed to have an uneven surface with fine projections and recesses to enhance the adhesion of the cathode active material to the surface of the cathode current collector. The cathode current collector may be in any of various forms, including a film, a sheet, a foil, a net, a porous structure, a foam, and a non-woven fabric. For example, the cathode current collector may be an aluminum foil.

Next, the anode may be manufactured as follows.

An anode active material, a conducting agent, a binder, and a solvent may be mixed together to prepare an anode active material composition. Subsequently, the anode active material composition may be directly coated on an anode current collector to manufacture the anode. In an embodiment, the anode active material composition may be cast on a separate support to form an anode active material film. This anode active material film may then be separated from the support and laminated on a metal current collector, to thereby manufacture the anode.

The anode active material may include lithium metal, a metal alloyable with lithium, a transition metal oxide, a non-transition metal oxide, a carbonaceous material, or a combination thereof. However, an embodiment is not limited thereto. Any suitable anode active material may be used. Non-limiting examples of the metal that is alloyable with lithium may include Si, Sn, Al, Ge, Pb, Bi, Sb, a Si—Y' alloy (wherein the element Y' may be an alkali metal, an alkali earth metal, a Group 13 to Group 16 element, a transition metal, a rare earth element, or a combination thereof, and Y' is Si), a Sn—Z alloy (wherein the element Z may be an alkali metal, an alkali earth metal, a Group 13 to Group 16 element, a transition metal, a rare earth element, or a combination thereof, and Z is not Sn), or a combination thereof. In an embodiment, the elements Y' and Z may each independently be, for example, magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof. For example, the transition metal oxide may be a lithium titanium oxide, a vanadium oxide, or a lithium vanadium oxide. For example, the non-transition metal oxide may be $SnO_2$, $SiO_x$ (wherein $0<x<2$), or a silicon-carbon composite (SiC). A combination comprising at least one of the foregoing anode active materials may also be used.

For example, the carbonaceous material may be crystalline carbon, amorphous carbon, or a combination thereof. Non-limiting examples of the crystalline carbon may include graphite, such as natural graphite or artificial graphite that are in amorphous, plate, flake, spherical, or fibrous form, or a combination thereof. Non-limiting examples of the amorphous carbon may be soft carbon (carbon sintered at low temperatures), hard carbon, meso-phase pitch carbides, sintered cokes, or a combination thereof.

The binder in the anode active material composition may be, for example, polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenylene sulfide, polyamide imide, polyether imide, polyether sulfone, polyamide, polyacetal, polyphenylene oxide, polybutylene terephthalate, an ethylene-propylene-diene monomer (EPDM), sulfonated EPDM, styrene-butadiene rubber (SBR), fluoro rubber, a copolymer thereof, or a combination thereof. However, an embodiment is not limited thereto. Any binder suitable for an anode may be used.

The conducting agent, the binder, and the solvent used in the anode active material composition may be the same as those used in the above-described cathode active material composition. The amounts of the anode active material, the conducting agent, the binder, and the solvent may be the same as those used in lithium batteries, and may be determined by the person of skill in the art without undue experimentation. In an embodiment, a plasticizer may be added to the cathode active material composition and/or the anode active material composition to facilitate the formation of pores in the electrode mixture. The anode may be manufactured, for example, by preparing solid components including about 94 wt % of the anode active material, about 3 wt % of the conducting agent, and about 3 wt % of the binder and adding the solvent up to about 70 wt % of the solid components to prepare an anode active material slurry, and then coating, drying, and roll-pressing the anode active material slurry on an anode current collector.

The anode current collector may have a thickness of, for example, about 3 μm to about 50 μm, or about 3 μm to about 40 μm, or about 5 μm to about 30 μm. The anode current collector may be any material having a high electrical conductivity and which does not cause a chemical change in the lithium battery. For example, the anode current collator may be copper, stainless steel, aluminum, nickel, titanium, sintered carbon, copper or stainless steel that is surface-treated with carbon, nickel, titanium, or silver, or a combination thereof. For example, the anode current collector may be processed to have an uneven surface with fine projections and recesses to enhance the adhesion of the anode active material to the surface of the anode current collector. The anode current collector may be in any of various forms, including a film, a sheet, a foil, a net, a porous structure, a foam, and a non-woven fabric. For example, the anode current collector may be a copper foil.

Next, a separator that is to be interposed between the cathode and the anode may be prepared.

The separator may be any separator suitably used for a lithium battery. The separator may have low resistance to migration of ions present in an electrolyte and an excellent electrolyte-retaining ability. For example, the separator may include glass fiber, polyester, polyethylene, polypropylene, polytetrafluoroethylene (PTFE, available under the trade name TEFLON), or a combination thereof, each of which may be in the form of a non-woven or woven fabric. For example, a rollable separator including polyethylene and/or polypropylene may be used for a lithium ion battery. A separator with an excellent electrolyte-retaining ability may be used for a lithium ion polymer battery.

For example, the separator may be manufactured in the following manner.

A polymer resin, a filler, and a solvent may be combined together to prepare a separator composition. The separator composition may be directly coated on an electrode and then dried to thereby form the separator. In an embodiment, the separator composition may be cast on a support and then dried to form a separator film. This separator film may then be separated from the support and laminated on an electrode to thereby form the separator.

The polymer resin used to manufacture the separator may be any material suitable for use as a separator between the electrodes. The polymer resin used to manufacture the separator may be, for example, a vinylidenefluoride/hexafluoropropylene copolymer, polyvinylidene fluoride (PVDF), polyacrylonitrile, polymethyl methacrylate, or a combination thereof.

Next, an electrolyte that is to be placed between the cathode and the anode may be prepared as follows.

The electrolyte may be, for example, an organic liquid electrolyte. The organic liquid electrolyte may be prepared, for example, by dissolving a lithium salt in an organic solvent. The organic solvent may be any suitable organic solvent. For example, the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxane, 4-methyldioxane, N, N-dimethylformamide, dimethylacetamide, dimethylsulfoxide, 1,2-dimethoxyethane, sulfolane, dichloroethane, chlorobenzene, nitrobenzene, diethylene glycol, dimethyl ether, or a combination thereof.

Any suitable lithium salt available in the art may be used as the lithium salt. The lithium salt may include, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof.

For example, the electrolyte may further include a non-aqueous liquid electrolyte, an organic solid electrolyte, or an inorganic solid electrolyte, in addition to the above-described organic liquid electrolyte. The organic solid electrolyte may be, for example, a polyethylene derivative, a polyethylene oxide derivative, a polypropylene oxide derivative, a phosphate ester polymer, a polyester sulfide, a polyvinyl alcohol, a polyvinylidene fluoride, a polymer including an ionic dissociation group, or a combination thereof. The inorganic solid electrolyte may be, for example, $Li_3N$, LiI, $Li_5NI_2$, $Li_3N$—LiI—LiOH, $LiSiO_4$, $Li_2SiS_3$, $Li_4SiO_4$, $Li_4SiO_4$—LiI—LiOH, $Li_3PO_4$—$Li_2S$—$SiS_2$, or a combination thereof.

Figure 6:
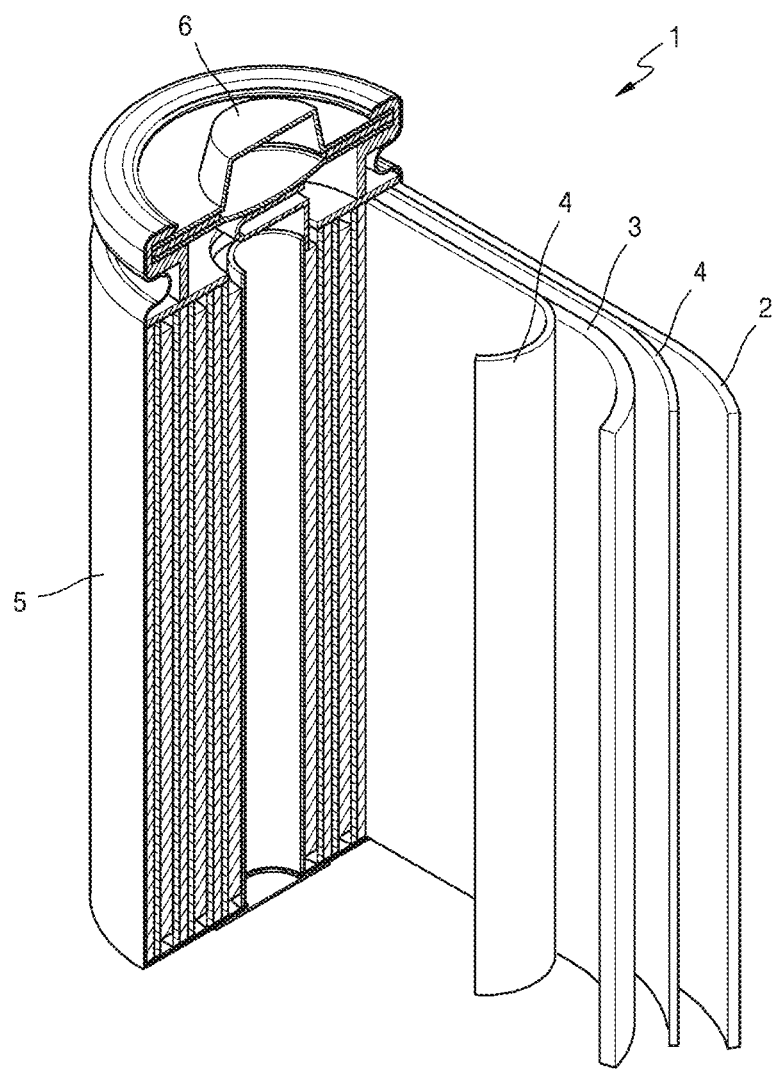
FIG. 6 is a schematic view of a lithium battery according to an embodiment.

Referring to FIG. 6, a lithium battery 1 according to an embodiment may include a cathode 3 according to the above-described embodiment, an anode 2, and a separator 4 between the anode 2 and the cathode 3. The cathode 3, the anode 2, and the separator 4 may be wound or folded, and then sealed in a battery case 5. Subsequently, an electrolyte may be injected into the battery case 5, and the battery case 5 may then be sealed with a cap assembly 6, to thereby complete the manufacture of the lithium battery 1. For example, the battery case 5 may be a cylindrical type, a rectangular type, or a thin-film type. Although not illustrated, in a lithium battery according to another embodiment, a separator between the cathode and the anode may form a battery structure. This battery structure may be stacked on another battery structure to form a bi-cell structure. The bi-cell structure may be impregnated with an electrolyte and then accommodated and sealed in a pouch, to thereby complete the manufacture of a lithium ion polymer battery. In an embodiment, a plurality of battery structures may be stacked upon one another to form a battery pack. This battery pack may be used in any device that benefiting from high capacity and a high power output power source, for example, in laptop computers, smart phones, electric vehicles, and the like. For example, the lithium battery may be used in, for example, power tools actuated by electric motors; electric vehicles (EVs), including hybrid electric vehicles (HEVs), plug-in hybrid electric vehicles (PHEV), and the like; electric two-wheeled vehicles, including electric bicycles and electric scooters; electric golf carts; or power storage systems. However, an embodiment is not limited thereto.

As used herein, the term "alkyl" refers to a saturated branched or unbranched (or straight-chained or linear), monovalent hydrocarbon group. Non-limiting examples of the "alkyl" group are methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the "alkyl" group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidano group, a hydrazine, a hydrazone, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxyl group, a C6-C20 heteroaryloxyalkyl group, or a C6-C20 heteroarylalkyl group.

The term "halogen" indicates fluorine, bromine, chloride, iodine, or the like.

The term "cyano" refers to —CN.

The term "cyanoalkyl" refers to —R—CN, wherein R indicates "alkyl," and preferably R is a C1-C20 alkyl group, most preferably wherein R is C1-C10 alkyl group.

An embodiment of the present disclosure will now be described in detail with reference to the following examples. However, these examples are only for illustrative purposes and are not intended to limit the scope of the any embodiments of the present disclosure.

EXAMPLES

Manufacture of Cathode and Lithium Battery

Comparative Example 1:
CB+CNT/PVDF+mPVDF+NBR+0 wt % PVA-CN

A 7:3 (by weight) mixture of linear carbon nanotubes (CNTs) having an aspect ratio of 10 or greater and particulate carbon black (CB) having an aspect ratio of less than 2 (Ketjen black ECP, EC300J, AkzoNobel) was added as a conducting agent into a first non-fluorine-based binder solution (NBR, a binder solution of hydrogenated acrylonitrile-butadiene binder dispersed in NMP, BM-720H, weight average molecular weight=300,000 grams per mole (g/mol), Tg=−30° C., Nippon Zeon Co. Ltd., Japan), and then agitated using a planetary centrifugal mixer (hereinafter, "THINKY MIXER™", THINKY™ Corporation, USA) at about 2000 rotations per minute (rpm), several times each for about 10 minutes, to prepare a conducting agent slurry.

A first fluorine-based binder solution (PVDF, SOLEF® 6020, weight average molecular weight=700,000 g/mol, Solvay, Belgium) and $LiNi_{0.88}Co_{0.08}Mn_{0.04}O_2$ as a cathode active material were added into the conducting agent slurry, and then agitated using the THINKY MIXER™ at about 1000 rpm for about 5 minutes to thereby prepare a first active material slurry.

A second fluorine-based binder solution (mPVDF, carboxyl group (—COOH)-containing modified PVDF, SOLEF® 5130, weight average molecular weight=1,000,000 g/mol, Solvay, Belgium) was added to the first active material slurry and then agitated using the THINKY MIXER™ at about 1000 rpm for about 5 minutes to thereby prepare a second active material slurry.

The second active material slurry was coated on an aluminum foil having a thickness of about 12 μm, dried at about 110° C. for about 2 hours, and then roll-pressed to thereby manufacture a cathode having a loading level (or capacity per unit area) of about 6.0 mAh/cm$^2$ and a mixture density of about 3.6 g/cc.

A weight ratio of the cathode active material to the conducting agent to a binder composition in the cathode was about 97.7:1:1.3, and a weight ratio of the first fluorine-based binder, to the second fluorine-based binder, to the first non-fluorine-based binder in the binder was about 0.9:0.2:0.2.

A coin cell (CR2032 type) battery was manufactured using cathode lithium metal as a counter electrode, a polyethylene separator (Star® 20) having a thickness of about 20 μm, and an electrolyte prepared by adding 1.5 wt % of vinylene carbonate (VC) into a mixed solvent of fluoroethylene carbonate (FEC), ethylene carbonate (EC), ethylmethyl carbonate (EMC), and dimethyl carbonate (DMC) in a volume ratio of about 7:7:46:40, and dissolving 1.15 molar (M) $LiPF_6$ therein.

Example 1: CB+CNT/PVDF+mPVDF+NBR+0.5 wt % PVA-CN

A cathode and a lithium battery (i.e., coin cell) were manufactured in the same manner as in Comparative Example 1, except that a second non-fluorine-based binder (PVA-CN, cyanoethylpolyvinyl alcohol, CR-V, ShinEtsu Cellulose, Japan) was added to the second active material slurry and agitated using the THINKY MIXER™ at about 1000 rpm for about 5 minutes to prepare a third active material slurry and the third active material slurry was used to manufacture the cathode. The amount of the second non-fluorine-based binder (PVA-CN) was about 0.5 wt % based on a total weight of the cathode active material.

Example 2: CB+CNT/PVDF+mPVDF+NBR+1.0 wt % PVA-CN

A cathode and a lithium battery (i.e., coin cell) were manufactured in the same manner as in Comparative Example 1, except that the second non-fluorine-based binder (PVA-CN) was added to the second active material slurry and agitated using the THINKY MIXER™ at about 1000 rpm for about 5 minutes to prepare a third active material slurry, and the third active material slurry was used to manufacture the cathode. The amount of the second non-fluorine-based binder (PVA-CN) was about 1.0 wt % based on the total weight of the cathode active material.

Example 3: CB+CNT/PVDF+mPVDF+NBR+1.5 wt % PVA-CN

A cathode and a lithium battery (i.e., coin cell) were manufactured in the same manner as in Comparative Example 1, except that the second non-fluorine-based binder (PVA-CN) was added to the second active material slurry and agitated using the THINKY MIXER™ at about 1000 rpm for about 5 minutes to prepare a third active material slurry, and the third active material slurry was used to manufacture the cathode. The amount of the second nonfluorine-based binder (PVA-CN) was about 1.5 wt % based on the total weight of the cathode active material.

Example 4: CB+CNT/PVDF+mPVDF+NBR+2.0 wt % PVA-CN

A cathode and a lithium battery (i.e., coin cell) were manufactured in the same manner as in Comparative Example 1, except that the second non-fluorine-based binder (PVA-CN) was added to the second active material slurry and agitated using the THINKY MIXER™ at about 1000 rpm for about 5 minutes to prepare a third active material slurry, and the third active material slurry was used to manufacture the cathode. The amount of the second non-fluorine-based binder (PVA-CN) was about 2.0 wt % based on the total weight of the cathode active material.

Example 5: CB+CNT/0.6 wt % PVDF+mPVDF+NBR+0.3 wt % PVA-CN

A cathode and a lithium battery (i.e., coin cell) were manufactured in the same manner as in Comparative Example 1, except that the first fluorine-based binder (PVDF) was partially substituted with the second non-fluorine-based binder (PVA-CN).

A weight ratio of the cathode active material, the conducting agent, and the binder in the cathode was about 97.7:1:1.3, and a weight ratio of the first fluorine-based binder, to the second fluorine-based binder, to the first non-fluorine-based binder, to the second non-fluorine-based binder in the binder was about 0.6:0.2:0.2:0.3.

Example 6: CB+CNT/0.4 wt % PVDF+mPVDF+NBR+0.5 wt % PVA-CN

A cathode and a lithium battery (i.e., coin cell) were manufactured in the same manner as in Comparative Example 1, except that the first fluorine-based binder (PVDF) was partially substituted with the second non-fluorine-based binder (PVA-CN).

A weight ratio of the cathode active material, the conducting agent, and the binder in the cathode was about 97.7:1:1.3, and a weight ratio of the first fluorine-based binder, the second fluorine-based binder, the first non-fluorine-based binder, and the second non-fluorine-based binder in the binder was about 0.4:0.2:0.2:0.5.

Example 7: CB+CNT/0.2 wt % PVDF+mPVDF+NBR+0.7 wt % PVA-CN

A cathode and a lithium battery (coin cell) were manufactured in the same manner as in Comparative Example 1, except that the first fluorine-based binder (PVDF) was partially substituted with the second non-fluorine-based binder (PVA-CN).

A weight ratio of the cathode active material, the conducting agent, and the binder in the cathode was about 97.7:1:1.3, and a weight ratio of the first fluorine-based binder, the second fluorine-based binder, and the first non-fluorine-based binder in the binder was about 0.2:0.2:0.2:0.7.

Example 8: CB+CNT/PVDF+mPVDF+NBR+0.3 wt % PVA-CN

A cathode and a lithium battery (i.e., coin cell) were manufactured in the same manner as in Comparative Example 1, except that the first fluorine-based binder (NBR) was partially substituted with the second non-fluorine-based binder (PVA-CN), and the composition of the binder and the weight ratio of the cathode active material, the conducting agent, and the binder were changed.

The weight ratio of the cathode active material, to the conducting agent, to the binder in the cathode was about 94.5:2.5:3, a weight ratio of carbon nanotubes (CNTs) to carbon black in the conducting agent was about 1.75:0.75, and the weight ratio of the first fluorine-based binder, to the second fluorine-based binder, to the first non-fluorine-based binder, to the second non-fluorine-based binder in the binder was about 1.7:0.5:0.5:0.3.

Comparative Example 2: CB/PVDF

A cathode and a lithium battery (i.e., coin cell) were manufactured in the same manner as in Comparative Example 1, except that carbon black was used alone as the conducting agent, the first fluorine-based binder solution (PVDF) was used alone as the binder, and the weight ratio of the cathode active material, t the conducting agent, to the binder was changed to about 95:2.5:2.5.

Comparative Example 3: CB/PVDF+mPVDF

A cathode and a lithium battery (i.e., coin cell) were manufactured in the same manner as in Comparative Example 1, except that carbon black was used alone as the conducting agent, only the first fluorine-based binder solution (PVDF) and the second fluorine-based binder solution (mPVDF) were used as the binder, the weight ratio of the cathode active material, to the conducting agent, to the binder was changed to about 96:2:2.

Comparative Example 4: CB/PVDF+mPVDF+NBR+0.3 wt % PVA-CN (CNT not Included)

A cathode and a lithium secondary battery (i.e., coin cell) were manufactured in the same manner as in Example 8, except that carbon black was used alone as the conducting agent.

A weight ratio of the cathode active material, to the conducting agent, to the binder in the cathode was about 94.5:2.5:3, and a weight ratio of the first fluorine-based binder, to the second fluorine-based binder, to the first non-fluorine-based binder, to the second non-fluorine-based binder in the binder was about 1.7:0.5:0.5:0.3.

Evaluation Example 1: Thermal Stability Evaluation

The lithium batteries (i.e., coin cells) manufactured in Examples 1 to 4 and Comparative Example 1 were charged with a constant current of 0.1 C until a voltage of 4.35 V (with respect to Li) was reached, and then charged with a constant voltage of 4.35 V until the constant current value was reduced to 1/20 C. The cathode was separated from each of the lithium batteries for thermal stability evaluation. The thermal stability was evaluated using differential scanning calorimetry (DSC) by measuring a heat flow in a temperature range of about 30° C. to about 400° C. while increasing the temperature at a rate of about 10° C./min. The thermal stability evaluation results are shown in the thermogram of FIG. 1 and Table 1.

TABLE 1

| Example | Heat Flow, ΔH [J/g] |
| --- | --- |
| Comparative Example 1 | 1645 |
| Example 1 | 1567 |
| Example 2 | 1511 |
| Example 3 | 1436 |
| Example 4 | 1434 |

Referring to Table 1, the cathodes of Examples 1 to 4 including the second non-fluorine-based binder were found to have reduced calorific values compared to that of the cathode of Comparative Example 1 that did not include the second non-fluorine-based binder.

Referring to FIG. 1, exothermic peaks of the cathodes of Example 1 to 4 were found to be shifted overall towards higher temperatures, relative to the exothermic peak of the cathode of Comparative Example 1.

Accordingly, the cathodes of Examples 1 to 4 were found to have improved thermal stabilities, compared to the cathode of Comparative Example 1.

Evaluation Example 2: Evaluation of Charge and Discharge Characteristics at Room Temperature (25° C.)

The lithium batteries (i.e., coin cells) manufactured in Example 1 and Comparative Example 1 were charged with a constant current of 0.2 C rate at about 25° C. until a voltage of 4.35 V (with respect to Li) was reached, and then charged in a constant voltage mode in which the voltage of 4.35 V was maintained to a cut-off current of 0.05 C rate. Subsequently, the lithium batteries were discharged with a constant current of 0.2 C rate until a voltage of 2.8 V (with respect to Li) was reached (Formation process).

The lithium batteries after the formation process were charged with a constant current of 1.0 C rate at about 25° C. until a voltage of 4.35 V (with respect to Li) was reached, and then charged in a constant voltage mode in which the voltage of 4.35 V was maintained to a cut-off current of 0.05 C rate. Subsequently, the lithium batteries were discharged with a constant current of 0.1 C rate until a voltage of 2.8 V (with respect to Li) was reached ($1^{st}$ cycle). This charge and discharge cycle was repeated 50 times. Each of the charge and discharge cycles was followed by a rest time of about 20 minutes.

Figure 2:
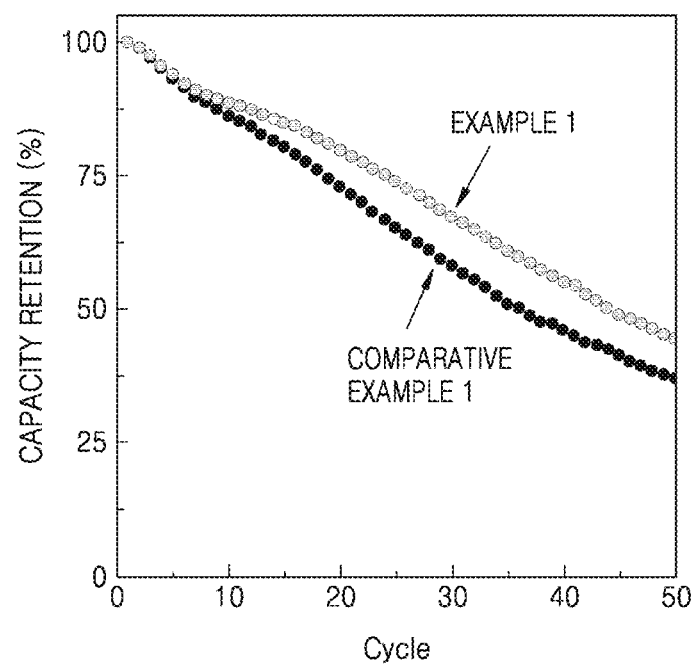
FIG. 2 is a graph of capacity retention (percent, %) versus cycle number, illustrating the room-temperature lifespan characteristics of lithium batteries manufactured in accordance with Example 1 and Comparative Example 1.

Some of the charge and discharge test results are shown in Table 2 and FIG. 2. The capacity retention at the $50^{th}$ cycle is defined by Equation 1 below.

Capacity retention=[Discharge capacity at $50^{th}$ cycle/ Discharge capacity at $1^{st}$ cycle]×100%  Equation 1

TABLE 2

| Example | Capacity retention [%] |
| --- | --- |
| Example 1 (PVA-CN 0.5 wt %) | 45 |
| Comparative Example 1 (PVA-CN 0.0 wt %) | 37 |

Referring to Table 2, the lithium battery of Example 1 having a high energy density due to the use of the cathode having a loading level of 6 mAh/cm² was found to have improved lifetime characteristics at room temperature, compared to the lithium battery of Comparative Example 1.

Accordingly, the lithium battery of Example 1 may exhibit improved thermal stability and cycle characteristics, compared to the lithium battery of Comparative Example 1.

Evaluation Example 3: Flexural Properties Evaluation

A flexural properties evaluation (3-point bending test) was performed on the cathode manufactured in Example 1 and Comparative Examples 2 and 3 according to the mechanical 3-point bending flexural properties test described in ASTM D790.

Each of the cathode plates manufactured in Example 1 and Comparative Examples 2 and 3 was cut to prepare test samples having a size of about 15 mm×20 mm. According to the mechanical 3-point bending flexural properties test, each sample was supported at first and second points spaced apart at a 10-mm interval. A force (load) was applied at a middle (third point) of the sample in a thickness direction with a probe at a constant speed of about 5 millimeters per minute (mm/min) to evaluate whether fracturing of the sample occurred. The evaluation results are shown in FIGS. 3A to 3D.

Figure 3A:
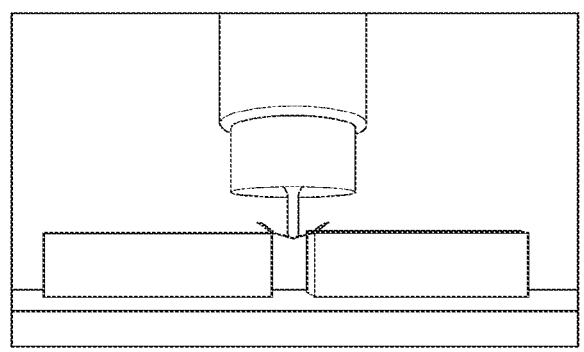
FIGS. 3A to 3C are illustrations of the flexural property results for the cathodes manufactured in Example 1 (FIG. 3C) and Comparative Examples 2 and 3 (FIGS. 3A and 3B), as measured by the three-point bending test according to ASTM D790.
Figure 3B:
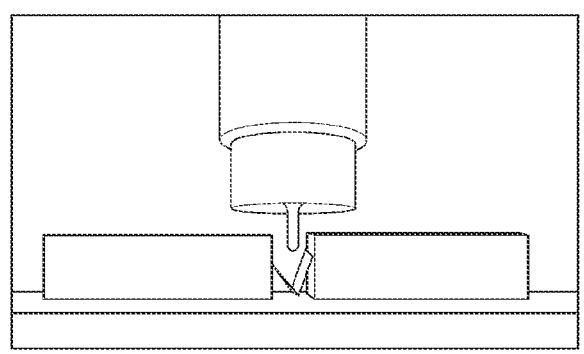

Referring to FIGS. 3A and 3B, the cathode samples of Comparative Examples 2 and 3 were fractured after bending at about 90 degrees or greater.

Figure 3C:
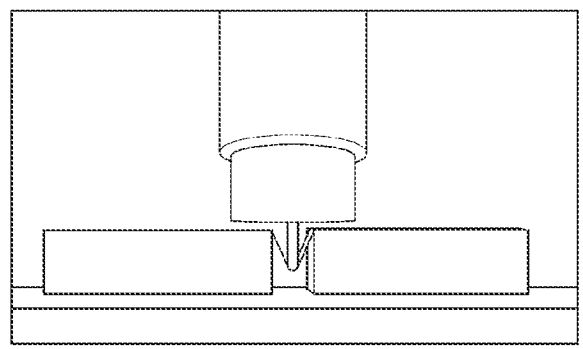

On the contrary, the cathode sample of Example 1 was not fractured even when bent at the maximum mechanical limit of greater than 90 degrees, as shown in FIG. 3C.

Figure 3D:
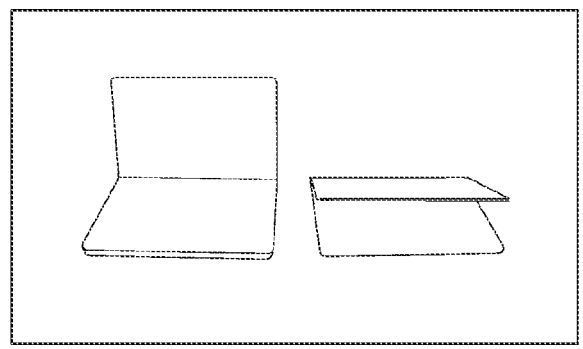
FIG. 3D is an illustration of the results of the three-point bending test measured by finger-pressing

The flexural properties were further tested by finger-pressing the cathode sample of Example 1 after the mechanical 3-point bending test. In the finger pressing method, the sample was further bent to an angle of 180 degrees by hand. In FIG. 3D, the cathode sample after the mechanical 3-point bending test is shown on the left, and the cathode sample after mechanical 3-point bending test and the bending test performed by finger-pressing, is shown on the right. Even when the cathode sample of Example 1 was bent to about 180 degrees by finger pressing, which is far greater than the bending angle of the 3-point bending test, the cathode sample of Example 1 remained bent but did not fracture.

Accordingly, the cathode of Example 1 was found to have improved flexibility even with a lower binder content, compared to the cathodes of Comparative Examples 2 and 3.

Evaluation Example 4: Evaluation of Charge and Discharge Characteristics at High Temperature (45° C.)

The lithium batteries (i.e., coin cells) of Examples 5 to 7 and Comparative Example 1 were charged with a constant current of 0.2C at about 25° C. until a voltage of 4.35 V (with respect to Li) was reached, and then charged in a constant voltage mode in which the voltage of 4.35 V was maintained to a cut-off current of 0.05C. Subsequently, the lithium batteries were discharged with a constant current of 0.2C until a voltage of 2.8 V (with respect to Li) was reached (Formation process).

A discharge capacity after the formation process was defined as "standard capacity."

The lithium batteries after the formation process were charged with a constant current of 0.5C at about 45° C. until a voltage of 4.35V (with respect to Li) was reached, and then charged in a constant voltage mode in which the voltage of 4.35 V was maintained to a cut-off current of 0.05C. Subsequently, the lithium batteries were discharged with a constant current of 0.5C until a voltage of 2.8 V (with respect to Li) was reached (1$^{st}$ cycle). This charge and discharge cycle was repeated 50 times. Each of the charge and discharge cycles was followed by a rest time of about 20 minutes.

Some of the charge and discharge test results are shown in Table 3. The capacity retention at the 50$^{th}$ cycle is defined by Equation 1.

Capacity retention=[Discharge capacity at 50$^{th}$ cycle/ Discharge capacity at 1$^{st}$ cycle]×100%  Equation 1

Each of the lithium batteries, after the charging and discharging at the high temperature (45° C.), was cooled down to room temperature, charged with a constant current of 0.2C at about 25° C. until a voltage of 4.35 V (with respect to Li) was reached, and then charged in a constant voltage mode in which the voltage of 4.35 V was maintained to a cut-off current of 0.05C. Subsequently, the lithium batteries were discharged with a constant current of 0.2C until a voltage of 2.8 V (with respect to Li) was reached (51$^{st}$ cycle). A discharge capacity at the 51$^{st}$ cycle was defined as "recovery capacity."

A capacity recovery was calculated from the discharge capacity (i.e., the standard capacity) at the formation stage and the discharge capacity (i.e., the recovery capacity) at the 51$^{st}$ cycle. The results are shown in Table 3 and FIG. 4. The capacity recovery is defined by Equation 2 below.

Capacity recovery=[Recovery capacity/Standard capacity]×100%  Equation 2

TABLE 3

| Example | Capacity retention [%] | Capacity recovery [%] |
|---|---|---|
| Example 5 (PVDF:PVA-CN = 0.6:0.3) | 65.3 | 89.2 |
| Example 6 (PVDF:PVA-CN = 0.4:0.5) | 61.6 | 90.2 |
| Example 7 (PVDF:PVA-CN = 0.2:0.7) | 56.4 | 90.5 |
| Comparative Example 1 (PVDF:PVA-CN = 0.9:0.0) | 55.0 | 84.3 |

Figure 4:
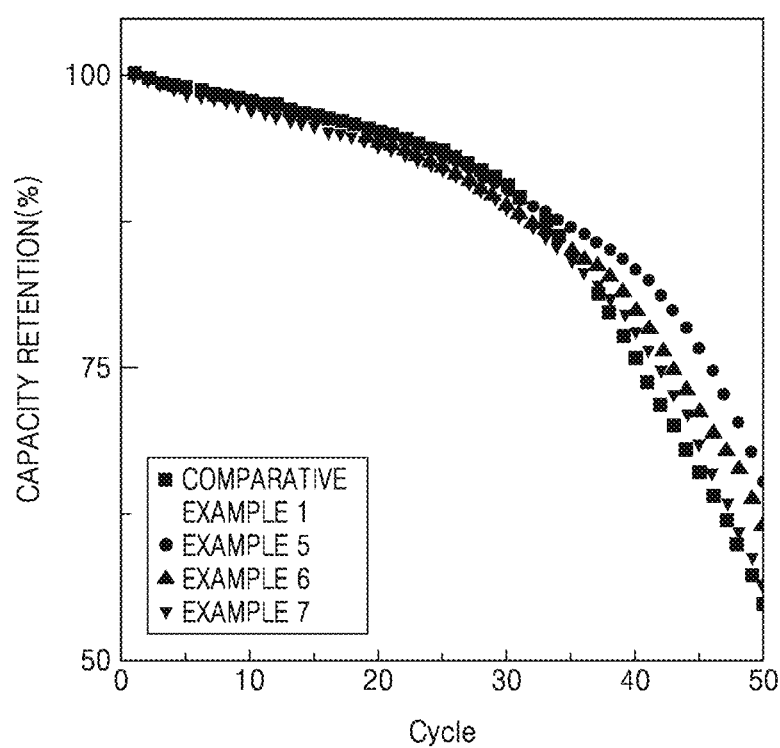
FIG. 4 is a graph of capacity retention (%) versus cycle number, illustrating the high-temperature lifetime characteristics of lithium batteries manufactured in accordance with Examples 5 to 7 and Comparative Example 1.

Referring to FIG. 4 and Table 3, the lithium batteries of Examples 5 to 7 were found to have improved high-temperature lifespan characteristics, compared to the lithium battery of Comparative Example 1. In particular, the lithium battery of Example 5 had further improved high-temperature lifespan characteristics than the lithium batteries of Examples 6 and 7.

The lithium batteries of Examples 5 to 7 were found to have improved capacity recoveries at room temperature after the charging and discharging at the high temperature, about 5% or greater higher than the capacity recovery of the lithium battery of Comparative Example 1.

Accordingly, the lithium batteries of Examples 5 to 7 were found to have a remarkably recovered reversibility of the electrode reaction even after exposure to the high temperature for a long time, compared to the lithium battery of Comparative Example 1, indicating improved thermal stability of the lithium batteries of Examples 5 to 7, compared to the lithium battery of Comparative Example 1.

Evaluation Example 5: Interfacial Resistance Evaluation

The lithium batteries (i.e., coin cells) manufactured in Examples 5 and 7 and Comparative Example 1 were charged with a constant current of 0.2C at about 25° C. until a voltage of 4.35 V (with respect to Li) was reached, and then charged in a constant voltage mode in which the voltage of 4.35 V was maintained to a cut-off current of 0.05C. Subsequently, the lithium batteries were discharged with a constant current of 0.2C until a voltage of 2.8 V (with respect to Li) was reached (Formation cycle).

The lithium batteries after the formation process were charged with a constant current of 0.5C at about 25° C. until a voltage of 4.35 V (with respect to Li) was reached, and then charged in a constant voltage mode in which the voltage of 4.35 V was maintained to a cut-off current of 0.05C. Subsequently, the lithium batteries were discharged with a constant current of 0.5C until a voltage of 2.8 V (with respect to Li) was reached (1$^{st}$ cycle). This charge and discharge cycle was repeated 50 times. Each of the charge and discharge cycles was followed by a rest time of about 20 minutes.

After termination of the 50 charge and discharge cycles, the lithium batteries were charged with a constant current of 0.5C at about 45° C. until a voltage of 4.35 V (with respect to Li) was reached, and then charged in a constant voltage mode in which the voltage of 4.35 V was maintained to a cut-off current of 0.05C.

Impedances of the charged lithium batteries were measured by electrochemical impedance spectroscopy (EIS) using an impedance analyzer (Biologic VMP3, Potentiostat) in a frequency domain of 1 megahertz (MHz) to 100 MHz with an alternating current having an amplitude of about 10 millivolts (mV). The measurement results are shown in FIG. 5.

Figure 5:
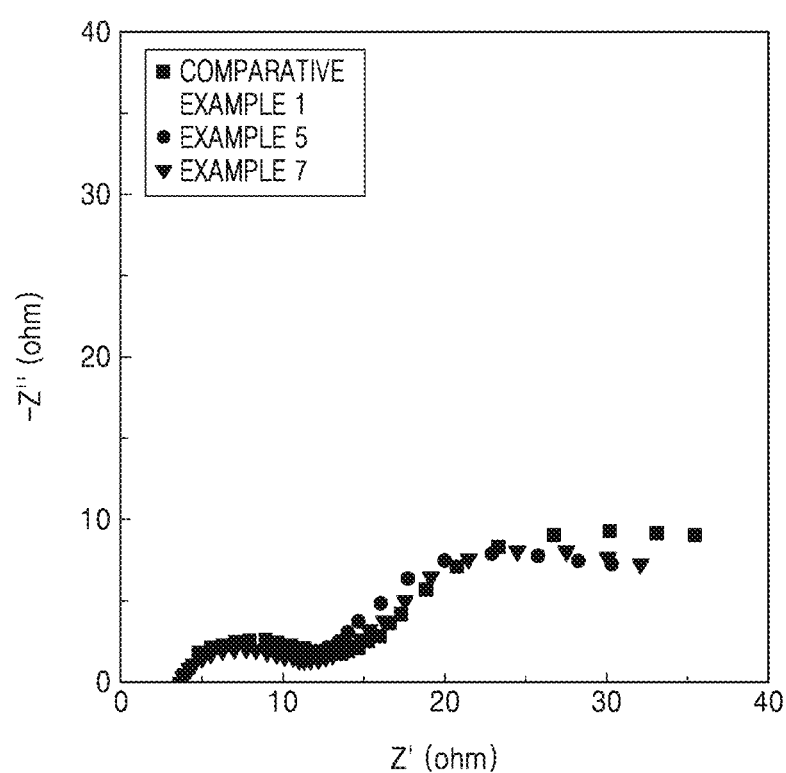
FIG. 5 is a Nyquist plot of imaginary impedance (−Z", ohm) versus real impedance (Z', ohm), showing the impedance measurement results of the lithium batteries manufactured in accordance with Examples 5 and 7 and Comparative Example 1.

Referring to FIG. 5, the lithium batteries of Example 5 and Example 7 were found to have reduced impedance, compared to the lithium battery of Comparative Example 1. Due to the improved lithium ion conductivities resulting from the inclusion of the second non-fluorine-based binder, the lithium batteries of Example 5 and Example 7 were found to have reduced interfacial resistance compared to the lithium battery of Comparative Example 1.

Evaluation Example 6: Evaluation of Charge and Discharge Characteristics at Room Temperature: Evaluation of Conducting Agent Effects The lithium batteries (i.e., coin cells) manufactured in Example 8 and Comparative Example 4 were charged with a constant current of 0.2C at about 25° C. until a voltage of 4.35 V (with respect to Li) was reached, and then charged in a constant voltage mode, while the voltage of 4.35 V was maintained, until a cut-off current of 0.05C. Subsequently, the lithium batteries were discharged with a constant current of 0.1C until a voltage of 2.8 V (with respect to Li) was reached (1$^{st}$ cycle, Formation cycle).

After the 1$^{st}$ cycle, the lithium batteries were charged with a constant current of 0.2C at about 25° C. until a voltage of 4.35 V (with respect to Li) was reached, and then charged in a constant voltage mode, while the voltage of 4.35 V was maintained, until a cut-off current of 0.05C. Subsequently, the lithium batteries were discharged with a constant current of 0.2C until a voltage of 2.8 V (with respect to Li) was reached (2$^{nd}$ cycle).

After the 2$^{nd}$ cycle, the lithium batteries were charged with a constant current of 0.2C at about 25° C. until a voltage of 4.35 V (with respect to Li) was reached, and then charged in a constant voltage mode, while the voltage of 4.35 V was maintained, until a cut-off current of 0.05C. Subsequently, the lithium batteries were discharged with a constant current of 0.33C until a voltage of 2.8 V (with respect to Li) was reached ($3^{rd}$ cycle).

After the $3^{rd}$ cycle, the lithium batteries were charged with a constant current of 0.2C at about 25° C. until a voltage of 4.35 V (with respect to Li) was reached, and then charged in a constant voltage mode in which the voltage of 4.35 V was maintained, until a cut-off current of 0.05C. Subsequently, the lithium batteries were discharged with a constant current of 0.5C until a voltage of 2.8 V (with respect to Li) was reached ($4^{th}$ cycle).

After the $4^{th}$ cycle, the lithium batteries were charged with a constant current of 0.2C at about 25° C. until a voltage of 4.35 V (with respect to Li) was reached, and then charged in a constant voltage mode in which the voltage of 4.35 V was maintained, until a cut-off current of 0.05C. Subsequently, the lithium batteries were discharged with a constant current of 1.0C until a voltage of 2.8 V (with respect to Li) was reached ($5^{th}$ cycle).

After the $5^{th}$ cycle, the lithium batteries were charged with a constant current of 0.2C at about 25° C. until a voltage of 4.35 V (with respect to Li) was reached, and then charged in a constant voltage mode in which the voltage of 4.35 V was maintained, until a cut-off current of 0.05C. Subsequently, the lithium batteries were discharged with a constant current of 3C until a voltage of 2.8 V (with respect to Li) was reached ($6^{th}$ cycle).

After the $6^{th}$ cycle, the lithium batteries were charged with a constant current of 0.2C at about 25° C. until a voltage of 4.35 V (with respect to Li) was reached, and then charged in a constant voltage mode in which the voltage of 4.35 V was maintained, until a cut-off current of 0.05C. Subsequently, the lithium batteries were discharged with a constant current of 0.5C until a voltage of 2.8 V (with respect to Li) was reached ($7^{th}$ cycle). The lithium batteries after the $7^{th}$ cycle were repeated charged and discharged to the $57^{th}$ cycle (50 times) under the same cycling conditions, except that the charging and discharging were performed at about 25° C. with 0.5C. Each of the charge and discharge cycles was followed by a rest time of about 20 minutes.

Some of the charge and discharge test results are shown in Table 6. The capacity retention at the $57^{th}$ cycle, the initial charge and discharge efficiency, and high-rate characteristics are defined as Equations 3, 4, and 5, respectively.

$$\text{Capacity retention [\%]} = [\text{Discharge capacity at } 57^{th} \text{ cycle}/\text{Discharge capacity at } 8^{th} \text{ cycle}] \times 100\% \quad \text{Equation 3}$$

$$\text{Initial efficiency [\%]} = [\text{Discharge capacity at } 1^{st} \text{ cycle}/\text{Charge capacity at } 1^{st} \text{ cycle}] \times 100\% \quad \text{Equation 4}$$

$$\text{High-rate characteristic [\%]} = [\text{Discharge capacity at } 6^{th} \text{ cycle } (3C \text{ rate})/\text{Discharge capacity at } 2^{nd} \text{ cycle } (0.2C \text{ rate})] \times 100\% \quad \text{Equation 5}$$

TABLE 4

| Example | Initial efficiency [%] | High-rate characteristic [%] | Capacity retention [%] |
|---|---|---|---|
| Example 8 | 94 | 64 | 62.1 |
| Comparative Example 4 | 94 | 46 | 39.1 |

Referring to Table 4, the lithium battery of Example 8 including the linear carbonaceous conducting agent was found to have a remarkably improved high-rate characteristic and capacity retention, though a similar initial efficiency, compared to the lithium battery of Comparative Example 4 including the particulate carbonaceous conducting agent alone.

As described above, according to an embodiment, a cathode may have improved flexibility and thermal stability by inclusion of a plurality of binders including a cyanoalkyl group-containing binder and a linear carbonaceous conducting agent.

According to an embodiment, a lithium battery may have improved lifespan characteristics by inclusion of the cathode having improved flexibility and thermal stability.

According to an embodiment, a lithium battery may have improved energy density by inclusion of the cathode having improved flexibility and thermal stability, the cathode including a nickel-rich lithium transition metal oxide and having an increased loading level.

It should be understood that the embodiment described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A cathode comprising:
   a cathode active material comprising a lithium transition metal oxide, wherein the lithium transition metal oxide comprises nickel and a non-nickel transition metal, wherein a content of the nickel in the lithium transition metal oxide is about 50 mole percent or greater with respect to a total number of moles of transition metals in the lithium transition metal oxide;
   a conducting agent comprising a linear carbonaceous conducting agent; and
   a binder composition comprising
      a first fluorinated binder not containing a polar functional group,
      a second fluorinated binder comprising a polar functional group,
      a first non-fluorinated binder comprising a cyano group, and
      a second non-fluorinated binder comprising a cyanoalkyl group.

2. The cathode of claim 1, wherein an amount of the second non-fluorinated binder is about 2 weight percent or less, based on a total weight of the cathode active material, the conducting agent, and the binder.

3. The cathode of claim 1, wherein the second non-fluorinated binder comprises a non-fluorinated polymer comprising a cyanoalkyl group depending from a backbone of the non-fluorinated polymer.

4. The cathode of claim 1, wherein the second non-fluorinated binder comprises a polymer comprising a group of the formula —OH and a group of the formula —O—RCN wherein R is an alkyl group.

5. The cathode of claim 1, wherein the second non-fluorinated binder comprises a cyanoalkyl polyvinyl alcohol, a cyanoalkyl pullulan, a cyanoalkyl cellulose, a cyanoalkyl hydroxymethyl cellulose, a cyanoalkyl hydroxyethyl cellulose, a cyanoalkyl hydroxypropyl cellulose, a cyanoalkyl starch, a cyanoalkyl dextrin, a cyanoalkyl collagen, a cyanoalkyl carboxymethyl cellulose, or a combination thereof, and
   the cyanoalkyl group comprises a C1-C10 alkyl group.

6. The cathode of claim 1, wherein the second non-fluorinated binder comprises cyanoethyl polyvinyl alcohol, a cyanoethyl pullulan, a cyanoethyl cellulose, a cyanoethyl hydroxyethyl cellulose, a cyanoethyl hydroxymethyl cellulose, a cyanoethyl hydroxypropyl cellulose, a cyanoethyl starch, a cyanoethyl dextrin, a cyanoethyl collagen, a cyanoethyl carboxymethyl cellulose, or a combination thereof.

7. The cathode of claim 1, wherein the second non-fluorinated binder is a cyanoethyl polyvinyl alcohol represented by Formula 1:

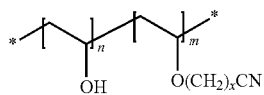

Formula 1 wherein, in Formula 1, n and m each denote a molar fraction of a repeating unit, $0 \leq n < 1$, $0 < m < 1$, $n+m=1$, and $x=2$.

8. The cathode of claim 1, wherein the first fluorinated binder is a vinylidene fluoride binder and has a weight average molecular weight of about 1,000,000 Daltons or less.

9. The cathode of claim 1, wherein the second fluorinated binder comprises:
a repeating unit derived from a polar functional group-containing monomer;
a repeating unit derived from vinylidene fluoride; and
optionally, a repeating unit derived from a fluorine-containing monomer comprising tetrafluoroethylene, hexafluoropropylene, chlorotrifluoroethylene, fluorovinyl, perfluoroalkyl vinyl ether, or a combination thereof.

10. The cathode of claim 9, wherein the second fluorinated binder has a weight average molecular weight of about 1,000,000 Daltons or greater.

11. The cathode of claim 1, wherein the polar functional group of the second fluorinated binder comprises a carboxylic acid group, a sulfonic acid group, a phosphoric acid group, an amino group, a hydroxyl group, a salt thereof, or a combination thereof.

12. The cathode of claim 1, wherein a weight ratio of the first fluorinated binder to the second fluorinated binder is about 90:10 to about 10:90.

13. The cathode of claim 1, wherein the first non-fluorinated binder comprises a repeating unit derived from an acrylonitrile monomer and a repeating unit derived from an olefin monomer.

14. The cathode of claim 1, wherein the linear carbonaceous conducting agent comprises a carbon nanotube, a carbon nanofiber, a carbon nanorod, or a combination thereof.

15. The cathode of claim 1, wherein the linear carbonaceous conducting agent has an aspect ratio of about 2 or greater.

16. The cathode of claim 1, wherein the conducting agent further comprises a particulate carbonaceous conducting agent, and
the particulate carbonaceous conducting agent has an aspect ratio of less than 2.

17. The cathode of claim 15, wherein the particulate carbonaceous conducting agent comprises carbon black, acetylene black, Ketjen black, channel black, furnace black, lamp black, summer black, natural graphite, artificial graphite, or a combination thereof.

18. The cathode of claim 15, wherein a weight ratio of the linear carbonaceous conducting agent to the particulate carbonaceous conducting agent is about 90:10 to about 10:90.

19. The cathode of claim 1, wherein the lithium transition metal oxide is a compound represented by Formula 2:

$$Li_aNi_xCo_yM_zO_{2-b}A_b$$ Formula 2 wherein, in Formula 2, $1.0 \leq a \leq 1.2$, $0 \leq b \leq 0.2$, $0.7 \leq x < 0.99$, $0 < y \leq 0.3$, $0 < z \leq 0.3$, $x+y+z=1$,
M is Mn, V, Mg, Ga, Si, W, Mo, Fe, Cr, Cu, Zn, Ti, Al, B, or a combination thereof, and
A is F), S, Cl, Br, or a combination thereof.

20. The cathode of claim 1, wherein the lithium transition metal oxide is a compound represented by Formula 3, Formula 4, or a combination thereof:

$$LiNi_xCo_yMn_zO_2,$$ Formula 3 or $$LiNi_xCo_yAl_zO_2,$$ Formula 4 wherein, in Formula 3 and Formula 4, $0.8 \leq x \leq 0.99$, $0 < y \leq 0.2$, and $0 < z \leq 0.1$.

21. The cathode of claim 1, wherein a loading level of the cathode is about 4.0 milliampere hours per square centimeter or greater.

22. The cathode of claim 1, wherein the cathode does not break when bent about 90 degrees or greater, as measured by a flexural property test in accordance with ASTM D790.

23. A lithium battery comprising:
the cathode of claim 1;
an anode; and
an electrolyte between the cathode and the anode.

* * * * *